(12) United States Patent
McNeely et al.

(10) Patent No.: US 7,117,411 B2
(45) Date of Patent: Oct. 3, 2006

(54) METHODS AND SYSTEMS FOR TESTING COMMUNICATIONS NETWORK COMPONENTS

(75) Inventors: Tracy J. McNeely, Durham, NC (US); Stuart D. Blackburn, Raleigh, NC (US); Hynek Bures, Wake Forest, NC (US)

(73) Assignee: Tekelec, Calabasas, CA (US)

( * ) Notice: Subject to any disclaimer, the term of this patent is extended or adjusted under 35 U.S.C. 154(b) by 735 days.

(21) Appl. No.: 10/011,673

(22) Filed: Oct. 29, 2001

(65) Prior Publication Data

US 2002/0162059 A1    Oct. 31, 2002

Related U.S. Application Data

(60) Provisional application No. 60/243,691, filed on Oct. 27, 2000.

(51) Int. Cl.
*G01R 31/28*    (2006.01)

(52) U.S. Cl. ..................................................... 714/724
(58) Field of Classification Search .................. 714/25, 714/33, 40, 42–43, 712, 703, 724, 742; 324/73.1
See application file for complete search history.

(56) References Cited

U.S. PATENT DOCUMENTS

| | | | |
|---|---|---|---|
| 5,577,198 A | * | 11/1996 | Willrett et al. ................. 714/33 |
| 5,669,000 A | * | 9/1997 | Jessen et al. ................. 717/127 |
| 5,732,213 A | | 3/1998 | Gessel et al. |
| 5,987,633 A | | 11/1999 | Newman et al. |
| 6,148,277 A | | 11/2000 | Asava et al. |
| 6,158,031 A | * | 12/2000 | Mack et al. ................. 714/724 |
| 6,493,425 B1 | | 12/2002 | Abe |

FOREIGN PATENT DOCUMENTS

| | | |
|---|---|---|
| EP | 0 347 360 A2 | 12/1989 |
| EP | 0 973 296 A2 | 1/2000 |

* cited by examiner

*Primary Examiner*—Shelly Chase
(74) *Attorney, Agent, or Firm*—Jenkins, Wilson, Taylor & Hunt, P.A.

(57) ABSTRACT

A communications network test system facilitates autonomous or attendant-free interaction between the administrative interfaces of multiple network devices under test. The test system includes device-specific communication interface packages that map generic commands to device-specific commands. A generic package includes generic procedures that access the device-specific packages to perform common functions, such as startup and cleanup. Test cases can thus be written using the generic commands without requiring the tester to have knowledge of device-specific demands. In addition, multiple devices can be simultaneously tested and monitored using a single test platform.

39 Claims, 8 Drawing Sheets

| Signaling Gateway CIP | |
|---|---|
| ACL Command | CLI Command |
| InhibitLink(L1,1) | INH-SLK:LOC=1101:PORT=A |
| IsLinkAligned(L1,1) | REPT-STAT-SLK:LOC=1101:PORT=A |

METHODS AND SYSTEMS FOR TESTING COMMUNICATIONS NETWORK COMPONENTS

RELATED APPLICATIONS

This application claims the benefit of U.S. Provisional Patent Application No. 60/243,691 filed Oct. 27, 2000, the disclosure of which is incorporated herein by reference in its entirety.

TECHNICAL FIELD

The present invention relates to the testing of a communications network. More particularly, the present invention relates to methods and systems for automated, integrated testing of multiple devices in a communications network.

BACKGROUND ART

Wireless and wireline communications networks have evolved to encompass a variety of services, switching platforms, applications, data processing system hardware and equipment that are collectively referred to as network products. Before deploying such network products within a live network environment, it is important to first test these network products to ensure that their operation is as expected. Typical telecommunications environments rely upon network elements (e.g., packet switches, database nodes, routers, etc.) produced by a variety of manufacturers, and such network elements may each further include a number of operating system or application software revisions. Consequently, one of the primary objectives or goals of the testing process prior to deployment is to identify and resolve any potential problems in the provisioning of network services that may result from the diverse nature of the collection of network elements. Such problems may include, for example, compatibility problems between newly developed network elements and existing or legacy equipment/software.

A complete test regimen may involve multiple test platforms that are required to perform several tests in parallel on several switches, with a variety of resources being required to perform each test. For example, test platforms may require connections to several switches in order to send commands corresponding to a test, and to subsequently collect results of the test. From an operational standpoint, providing a dedicated connection from each test platform to each switch is typically not practical due to the large number of dedicated connections that would be involved. Furthermore, a particular test platform may not be capable of being physically connected to multiple switches at the same time.

As an alternative to simultaneous permanent connections, a temporary connection may be manually established from a test platform to a device under test (DUT) when the test platform needs to communicate with a test program executing on the DUT. However, such manual connection techniques are time consuming and inefficient, and consequently are often deemed unacceptable by network operators.

With particular regard to test platforms, it will be appreciated that such equipment can be driven by a data processing system software application that communicates with the DUT via commands over a serial connection. A problem with such test devices is that they typically require a command line interface dedicated to accomplishing a narrowly defined test objective and is therefore both cumbersome and time consuming to use. Scripted batch files that automate a series of commands from a test platform to the DUT can be used to alleviate this problem, as the use of batch files does not require manual entry of commands to the connected test device. Consequently, a single batch file, or small set of batch files, which contains all the commands necessary to accomplish a particular test objective may be employed to execute a complicated sequence of test instructions, thereby freeing the test operator to perform other tasks for duration of the test sequence. However, batch files must still be written using device-specific instructions and require that the operator have detailed knowledge of the command line interface commands of each device being tested.

FIG. 1 is a schematic diagram illustrating a conventional architecture associated with the testing of a telecommunications packet switch. FIG. 1 includes a test architecture, generally indicated by reference numeral 100, that is comprised of a test management platform (TMS) 110, a signal transfer point (STP) 112, a manually-operated STP administrative interface 114, a network test message generator/monitoring node 116 (e.g., the Tekelec MGTS™ testing and monitoring product), and a manually-operated administrative interface 118. It will be appreciated that STP 112 and MGTS™ 116 are directly connected via dedicated signaling system 7 (SS7) signaling links 120. MGTS™ 116 generates SS7 signaling message traffic and simulates SS7 signaling nodes that could be connected to STP 112 in a real network. TMS 110 and the two administrative interface terminals 114 and 118 are connected to STP 112 and MGTS 116 nodes via RS-232 links. More particularly, STP administrative terminal 114 and MGTS™ administrative terminal 118 are connected to the command line interfaces of STP 112 and MGTS 116, respectively. TMS 110 is also connected to the command line interfaces of both STP 112 and MGTS 116.

As such, it will be appreciated that a complex test scenario could involve a large degree of operator intervention and subsequent manual configuration of the two devices under test. For instance, a particular test of STP 112 may require that MGTS™ 116 attempt to bring one of the plurality of SS7 communication links 120 into service. Execution of this portion of the test can be initiated by TMS 110 via one or more commands that are sent to the MGTS node via the TMS-to-MGTS™ command line interface connection. A particular test scenario being executed by the TMS 110 could require a dynamic or decision-tree-type response on the part of the TMS (i.e., selection of the next test is dependent on the result of the preceding test). For instance, TMS 110 may be required to perform a second test, TestCase_AlignedTrue if the particular SS7 signaling link in question was successfully aligned. If the signaling link in question was not successfully aligned, TMS 110 may be required to perform a third test, TestCase_AlignedFalse. As such, a human operator is required to observe the results of the first test via the MGTS™ administrative terminal 118, and provide feedback to TMS 110. Such manual feedback is human-resource-intensive, inefficient and prone to operator error.

With regard to overall test tool evolution, the incorporation of graphical user interface (GUI) based enhancements to testing systems have been instrumental in making the testing process more intuitive and user-friendly. However, such enhancements have not focused on the human operator-intensive elements of the testing process, such as reducing the need for device-specific commands and different terminals connected to each device being tested.

Local area network (LAN) technology and communication architectures have also enhanced the testing of network products. GUIs are conveniently located, either locally or remotely, to a particular data processing system that drives the actual testing of network products. Client/server technology is utilized to provide remote access to test systems. A client application includes a GUI that allows a user to access a remote test system. A server application receives and processes requests from the client. The server also executes on a system in the network. The client/server framework allows a client to be located on any system in the network, even on the same system on which the server resides.

With the many varieties of network products and methodologies for testing of network products currently available, test devices must be proficient in testing a large number of applications and executing the many varieties of test cases associated with those applications. Thus, a test device must be capable of learning or adapting to new test case formats and new test interfaces as required.

A test case defines how a particular test will be performed. For example, a test case may simply be a batch file containing instructions for performing a test, or a test case may be a file of commands or directives administered through a GUI. Additionally, a test case may include a data structure stored in memory that is built by a data processing system upon receipt of instructions from a client or other application. Regardless of how a test case is implemented the, a test case embodies the action which will take place in order to perform a test.

From an operational perspective, there exists a need for the capability for users in a network environment to share test cases and test case results for multiple devices under test in a test network environment. There also exists the need for a testing system that performs any type of test case without knowing the specific test case formats and methodologies of each and every test case available for execution on a test network.

Additionally, there exists a need for the capability of designating the test functions to be tested as a sequence of interrelated, cross-communicated test functions. As discussed briefly above with regard to the example shown in FIG. 1, values produced as output by a first DUT may be used as input by a second DUT. However, as indicated above, using the results from one test case as input to another test case requires manual intervention by an operator with detailed knowledge of device-specific test case commands. Accordingly, there exists a long-felt need for methods and systems for testing communications network components that reduce the need for operator intervention and knowledge of device-specific test commands.

DISCLOSURE OF THE INVENTION

The present invention includes methods and systems for creating and executing sequences of interrelated test cases and providing a generalized test environment that allows complete automation of test cases. The test cases are independent of the number or types of devices under test. As such, a test operator responsible for writing a test script need not know the device-specific commands because test environment device packages map the device-specific commands to a common script language. Therefore, the operator need only be familiar with a common script language rather than device-specific test commands for multiple devices under test. Furthermore, the present invention provides a common interface that allows interaction between multiple devices under test, thereby achieving the desired system performance described above.

According to one aspect, the present invention includes a communications network testing system that facilitates autonomous or attendant-free interaction between the administrative interfaces of multiple network devices under test. The present invention includes an abstract command language (ACL) interface that enables cross-communication between dissimilar devices (i.e., devices that employ different administrative interface protocols). As such, the results of a first test on a first device under test may be used to automatically trigger the reconfiguration of a second DUT and subsequent execution of a second test. Furthermore, the second test may utilize information returned from the first test on the first DUT. Again, it is particularly significant that the first DUT triggers a reconfiguration of the second DUT, even though the first DUT and second DUT may employ different administrative interface protocols. Such functionality allows complex test sequences that involve interaction among multiple DUTs to be easily automated and remotely executed without requiring a significant degree of human test operator intervention. The abstract command language interface has a layered architecture that includes a tool command language (TCL) object-based interface layer. This TCL object-based layer utilizes the abstract command language to facilitate communication with various independent testing and switching equipment via access to their respective administrative command line interfaces. A unique, device-specific communication interface package is included for each type of device under test.

According to another aspect, the present invention includes a fully integrated test case and test plan editor, where test plans and their associated test cases are maintained in a version-controlled environment.

According to yet another aspect, the present invention includes an arbitration engine that dynamically allocates resources when users attempt to simultaneously schedule test cases that require the same resources.

The version-controlled environment may be extended to include operating software associated with each DUT. As such, a test plan may specify a particular version of a test case, which may in turn specify a particular program or software version that is to be installed on a given DUT for the duration of the test. Corresponding test results may also be stored and maintained in the version-controlled environment.

The present invention further includes a graphical user interface that may be accessed and operated via a wide area network or local area network connection. This GUI simultaneously displays test plan, test case, and corresponding test results. The GUI is further adapted to provide access to the test plan/test case editor, as described above.

Accordingly, it is an object of the present invention to provide a test system that facilitates real-time, inter-DUT communication during execution of a test without requiring human test operator intervention.

It is another object of the present invention to provide communication interface packages for mapping abstract command language commands to device-specific commands so that a test case designer is not required to have specific knowledge of device-specific commands.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 5 is a block diagram illustrating exemplary contents of a communication interface package according to an embodiment of the present invention.

DETAILED DESCRIPTION OF THE INVENTION

Figure 1:
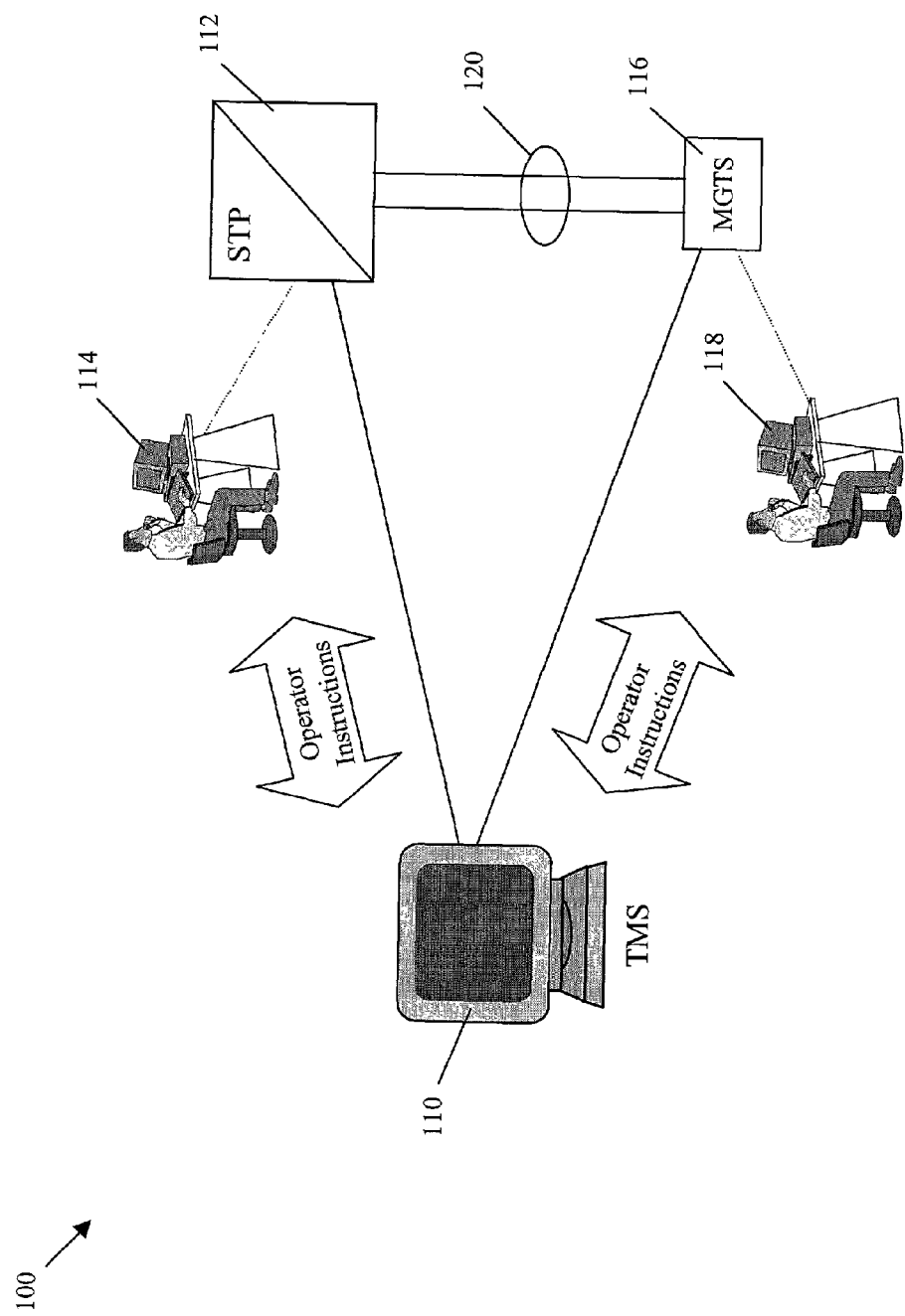
FIG. 1 is a schematic diagram illustrating a conventional test system architecture.
Figure 2:
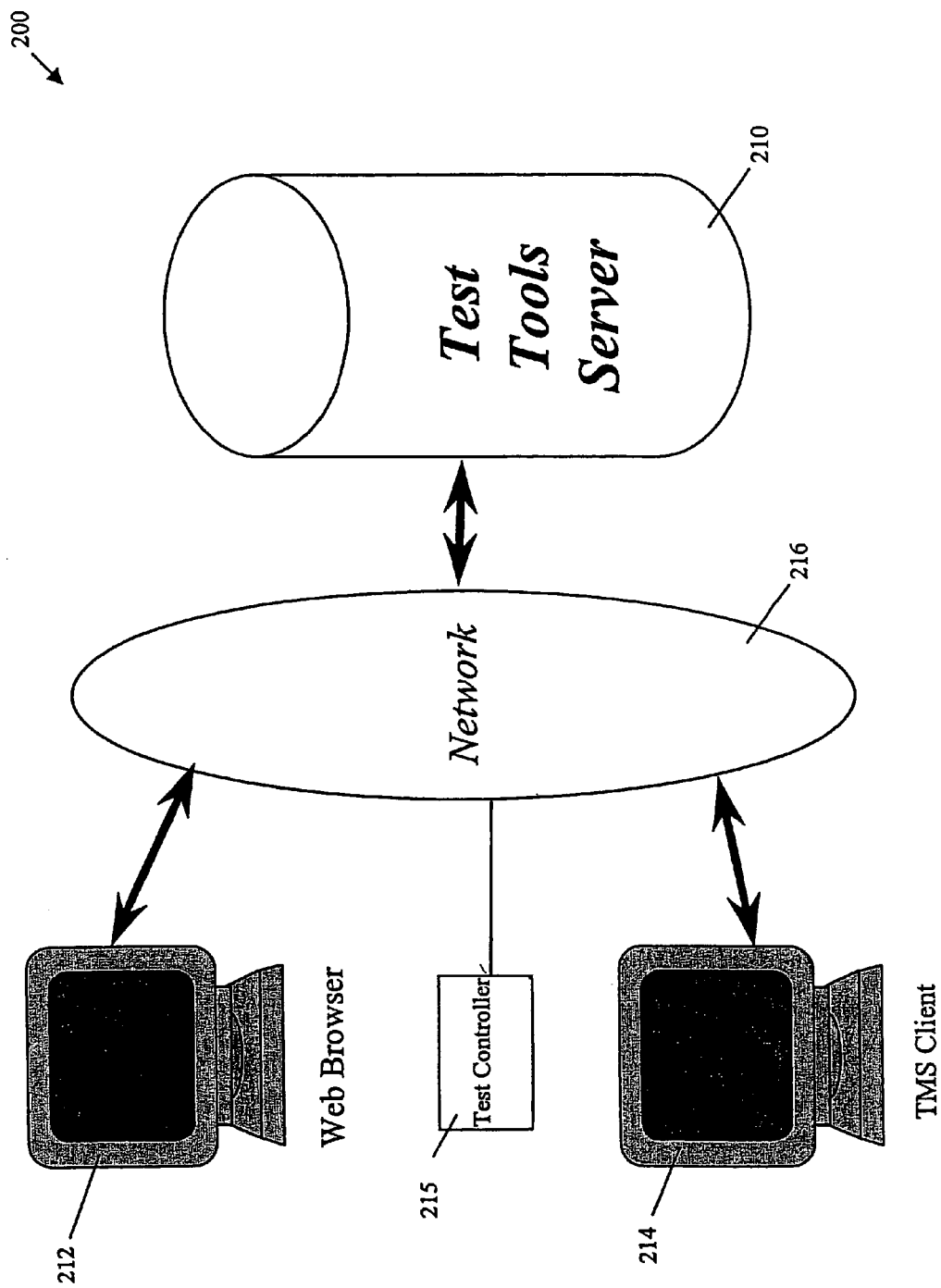
FIG. 2 is a schematic diagram illustrating a test system according to an embodiment of the present invention.

FIG. 2 is a simplified schematic diagram of a test system according to an embodiment of the present invention. In FIG. 2, test system 200 includes a test tools server 210, a browser 212, a test management system client 214, and a test controller 215, all of which are connected via network 216. Server 210, browser 212, client 214 and controller 215 may each execute on general purpose computing platforms. Network 216 may be a private wide or local area network (i.e., corporate intranet) or a public WAN, such as the Internet.

Test tools server 210 maintains a library of device-specific communication interface packages, where each device-specific communication interface package contains information for mapping executable instructions between a common or abstract command language and the command line interface language of a specific device. Test tools server 210 may also maintain one or more generic communication interface packages that provide certain basic, core communication interface functionality that is device independent. Exemplary communication interface packages will be discussed in detail below.

In one embodiment, test tools server 210 maintains the communication interface package library in a version-controlled environment, such as that provided by the CLEAR-CASE™ available from Rational Software Corporation or similar version control system. As such, multiple versions of a single device-specific communication interface may be maintained in a secure and version-controlled manner.

In addition to maintaining a communication interface package library, test tools server 210 may also maintain a library of test plans and the associated individual test cases used in formulating test plans. In one embodiment, such test cases may include data files containing tool control language and abstract command language instructions. In any event, such test plan and test case information is maintained in a version-controlled environment, in much the same manner as the communication interface package library described above. Following the execution of a test plan or individual test case, test tools server 210 maintains the associated test results in a test results library that preferably also resides in a version-controlled environment. As such, all aspects of a particular test scenario (e.g., communication interface packages, test plans, test cases, and test results) are maintained in a version-controlled environment, which significantly enhances the quality control and auditing process associated with communication component and system testing.

Browser 212 allows a user to simultaneously view test plans, test cases and corresponding test results associated with various systems of devices or individual devices under test. As described above, such information is maintained in a version-controlled environment on test tools server 210 and is accessible via communications network 216. Browser 212 may execute on a disk operating system (DOS), WINDOWS®, or Unix-based computing platform Examples of browsers suitable for use with embodiments of the present invention include Netscape NAVIGATOR® or Microsoft INTERNET EXPLORER®. A plurality of browsers can be simultaneously connected to test tools server 210 via communications network 216 for simultaneous viewing of test cases and test case results. In the case where communications network 216 corresponds to a public WAN, such as the Internet, browsers 212 may execute on computers geographically located at great distances from the actual test laboratory where the physical test equipment is located. A test system of the present invention facilitates the testing of a communications system that includes multiple DUTs where the DUTs are not physically co-located.

Test management system client 214 communicates with test tools server 210 via network 216 and allows a user to perform a number of activities associated with test system operation including: scheduling test plan execution, constructing and editing of test plans, and constructing and editing test cases. Because the test plan, test case, and communication interface package information is maintained in a version-controlled environment on test tools server 210, multiple test management system clients or client sessions may be simultaneously active and in communication with test tools server 210 without the risk of operator confusion due to version problems.

Figure 3:
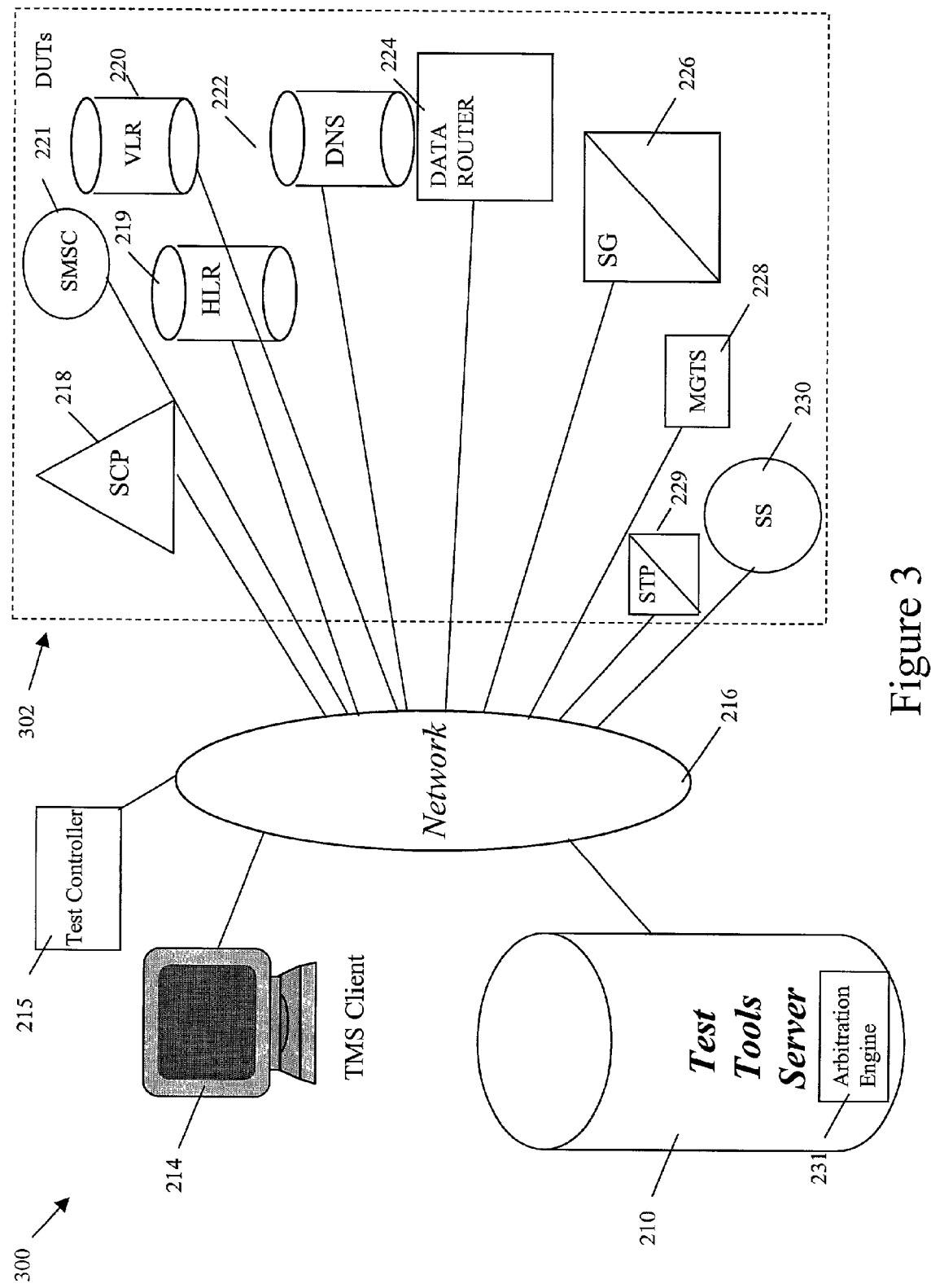
FIG. 3 is a schematic diagram illustrating a test environment that utilizes a test system according to an embodiment of the present invention.

FIG. 3 illustrates a test tools server 210, a test management system client 214, and a test controller 215 connected to multiple devices under test. In one embodiment, such devices under test may include, but are not limited to: a service control point (SCP) 218, a home location register (HLR) 219, a visitor location register (VLR) 220, a short message service (SMSC) 221, a domain name system (DNS) server 222, a data packet router 224, a signaling gateway (SG) 226, a network simulator and monitoring device 228, a signal transfer point 229, and a softswitch (SS) node 230. The communication nodes listed above are well known to those skilled in the art of telecommunication and data networks, and as such will not be described in detail herein. A detailed description of the illustrated signaling system 7 (SS7) and IP communications devices (e.g. SCP 218, SG 226, STP 229, and softswitch 230) can be found in Russel, Travis, *Signaling System #7*, McGraw-Hill, Third Edition, 2000. A detailed description of the illustrated wireless communication network elements (e.g. HLR 219, VLR 220, and SMSC 221) can be found in Mouly, M. and Pautet, M. B., *The GSM System for Mobile Communications*, Cell & Sys, First Edition, 1992. Data communications network elements 222 and 224 are described in Stevens, Richard, *TCP/IP Illustrated, Volume I: The Protocols*, Addison-Wesley, 1994.

In order to test one or more devices, test management system client 214 accesses a test plan and associated test case files from test tools server 210 and requests that the test cases be executed by test controller 215. Test controller 215 establishes connections with the devices under test and executes the test cases received from test tools server 210. Results associated with a particular test plan or test case are then provided to test tools server 210 for storage in the version-controlled environment. According to an important aspect of the invention, test tools server 210 includes an arbitration engine 231 that dynamically allocates resources when users attempt to simultaneously attempt to use the same resources. The automated test system architecture according to the present invention allows multiple users in multiple locations to utilize the same test system resources. For example, a test system user in Richardson, Tex. and a test system user in Morrisville, N.C. may each desire to test software on STP 229, which is located in a lab in Morrisville, N.C. Both users may access test tools server 210 using TMS clients 214 and schedule tests to be executed. Test tools server 210 may include a static scheduler that allows the users to select time slots for test execution in an attempt to avoid scheduling conflicts. However, because test cases can run longer than expected, one user's test may conflict with the time slot scheduled for another user's test. Arbitration engine 231 dynamically allocates resources, in this case, STP 229, so that the test cases do not conflict with each other. In this example, if user A's test case is nearly complete, arbitration engine 231 may allow the test to complete and dynamically re-schedule the test requested by user B. Exemplary dynamic resource allocation algorithms that may be used by arbitration engine 231 include random allocation, first in, first out, priority scheduling, etc. Using one or more of these resource allocation algorithms, arbitration engine 231 dynamically resolves resource conflicts before they occur.

As illustrated in FIG. 3, test controller 215 is capable of simultaneously communicating with multiple DUTs. Test controller 215 also facilitates autonomous or attendant-free interaction between the administrative interfaces of multiple network devices under test. As such, the results of a first test on a first device under test may be used to automatically trigger the reconfiguration of a second device under test and the subsequent execution of a second test, where second test may utilize information returned from the first test on the first device under test.

It is an important aspect of the invention that test controller 215 allows a first DUT to trigger a reconfiguration of a second DUT, even though the first DUT and the second DUT may be completely different types of communication devices with different administrative or command line interfaces. Such functionality allows complex test sequences that involve interaction among multiple DUTs to be easily automated and remotely executed without requiring a significant degree of human test operator intervention. For instance, in the case of SS7 telecommunications related devices that utilize the message transfer part (MTP) protocol, complete MTP level two or level three conformance testing can be accomplished in a matter of hours with little or no human-operator intervention. Previously, such comprehensive testing was human-operator-intensive and could take one or more weeks to complete.

Figure 4:
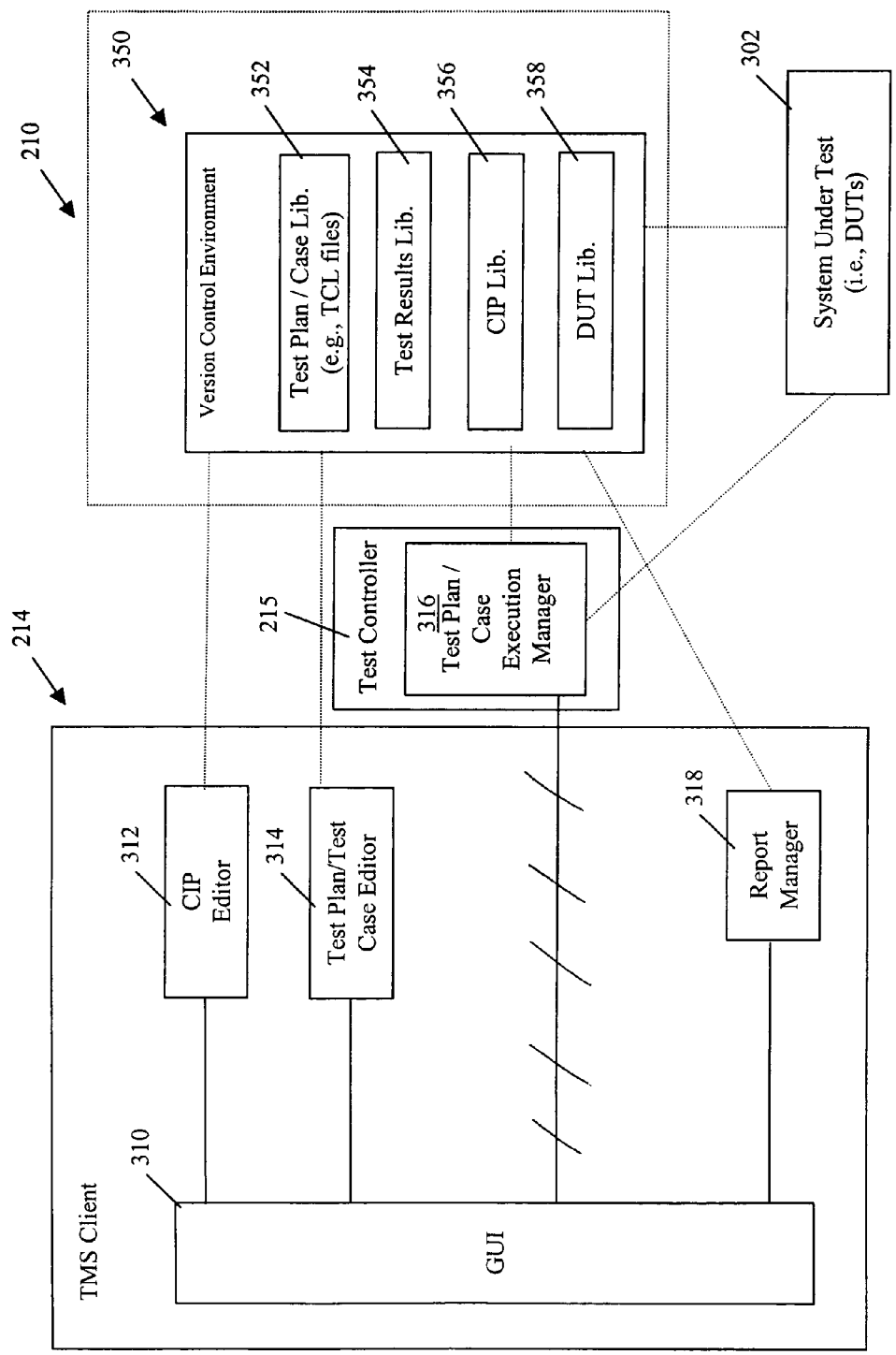
FIG. 4 is a block diagram illustrating a test management system client and version control system according to an embodiment of the present invention.

FIG. 4 is block diagram of one embodiment of a test system of the present invention including a TMS client 214, a test controller 215, a system of devices under test 302, and a test tools server 210. In this embodiment, TMS client 214 includes a graphical user interface 310, a test plan/test case editor 314, and a reporting manager 318. Test controller 215 includes a test plan and test case execution manager for executing test cases received from test tools server 210. GUI 310 provides a human operator with an easy-to-use, icon-driven interface to the overall test system of the present invention. GUI 310 enables an operator with minimal knowledge of the devices under test and their respective administrative interface protocols to perform a complex battery of integration and system performance tests.

Test tools server 210 illustrated in FIG. 4 includes a version control environment 350, such as CLEARCASE™. A number of database elements, including a test plan/test case library 352, a test results library 354, a communication interface package library 356, and a device under test operating software library 358, reside within version-controlled environment 350. Individual software files (e.g., source code, compiled code, scripts, data, etc.) are stored in such an environment so that user access to and manipulation of the files may be controlled and monitored.

According to an important aspect, the present invention includes a plurality of communication interface packages. A communication interface package is a software entity that defines the mapping between device-specific command line interface commands and common or device-independent abstract command language commands. In a preferred embodiment, communication interface packages include classes having functions and data structures used to test specific devices. Examples of mapping functions that may be included in a communication interface package are shown in FIG. 5. In FIG. 5, communication interface package 370 includes mapping information associated with a signaling gateway (SG). The term "signaling gateway," as used herein, refers to a network element capable of routing both SS7 and IP messages. In this particular example, an abstract command language command "IsLinkAligned(L,1,1)" that is related to the alignment status of a communication link is mapped to the corresponding signaling-gateway-specific command line interface command, "REPT-STAT-SLK:LOC=1101:PORT=A." Functionally similar abstract command language commands associated with different devices may utilize the same root command with different arguments. For instance, a communication interface package associated with a service control point may include the following link alignment status abstract command language command, "IsLinkAligned(L5)," where L5 is a signaling link connected to the service control point. As such, different devices can share a command structure that is common to a large degree, and highly intuitive from an operator's perspective.

Referring back to FIG. 4, communication interface packages may be stored in communication interface package library 356 that is maintained in version-controlled environment 350. As discussed above, communication interface packages may include software classes created using an object-oriented programming environment, such as C++ or J++. Consequently, a new communication interface package object can be created which inherits some or all of the properties associated with a parent communication interface package object. This inheritance capability facilitates the rapid creation of communication interface packages as new devices and new versions of existing devices are added to a test system. Communication interface packages may be included and compiled in text cases using INCLUDE statements or other statements that allow files to be incorporated into the compiled version of a test case.

Test plan and test case editor 314 allows a user to create and edit individual test cases as well as high-level test plans. In the most simplistic embodiment, a test case is a text file that contains a sequence of test instructions for testing one or more devices under test. A test plan is a sequence of test cases. Such test instructions may include abstract command language and tool command language commands that perform specific operations on a DUT. These instructions may also facilitate conditional processing based on the results returned from one or more devices under test. In addition, multiple test cases can be combined into a single test case data file and thereby provide test-plan-like functionality. A sample test case is shown below:

```
package require Mgts
package require Eagle
package require titen
# This is the startup code that wold be run before any test
# purposes are started.
proc startup {}{
    Mgts mgts1 $::env(MGTS_SHELF) $::env(MGTS_BUILD)
    Eagle eagle1 $::env(EAGLE_IP) $:: env(EAGLE_PORT)
    eagle login $::env(EAGLE_LOGIN)
$::env(EAGLE_PASSWORD) result
}

# This is the cleanup code that is run after all the test purposes
# have completed execution.
proc cleanup {}{
    Mgts::deleteAll
    Eagle::deleteAll
}
# Test Purpose #1
step tp {
    Purpose - ANSI Level 3 AQTest7.2.4
}{
    set nodename $::env(L3_NODE_NAME)
    set L1_1_card $::env(L1_1_CARD)
    set L1_1_port $::env(L1_1_PORT)
    infoline "Start the State Machine. L3 Node Name is
$nodename"
    mgts1 runSM $nodename AQTest7-2-4
    Mgts::expectEvent {
        MGTSState Transition(*,*,*,UserAction){
            # Got User Action
            infoline "Inhibiting link L1_1"
            break
        }
        MGTSState Transition(*,*,*,NotAligned){
            # The State Machine did not align. *DO NOT* continue
            infoline "Transitioned through NotAligned state!"
            result ABORTED
            return
        }
    }
    # Now, inhibit link L1_1
eagle1 Inhibit_Link(L1,1)
    if {![Eagle::isOK result]} {
            infoline "Eagle rejected command, check LOC and PORT
variables $result(command)"
            result ABORTED
            return
    }
    Mgts::expectEvent{
        MGTSState Transition(*,*,*,FAILED){
            # One of the State Machines failed. *DO NOT* continue
            infoline "Transitioned through FAIL state!"
            result FAIL
            return
        }
        MGTSState Transition(*,*,*,PASSED){
            # State Machines Passed
            infoline "Transitioned through PASS state"
            result PASS
            return
        }
        MGTSState Transition(*,*,UserAction,Stop){
            infoline "Transitioned through Timeout state! Failing
testcase."
            result FAIL
            return
        }
    }
}
# Start execution
run_testcase
```

In the code example, the "package require" statements include device packages required for the script. In this example, the device specific packages that are included are mgts, Eagle, and Titen. According to an important aspect, the Titen package includes procedures that allow the user to create test cases using generic commands. The procedures access the device specific packages for multiple devices being tested and perform the functions for each specific device. For example, the "proc startup{ }" procedure includes code for starting up and logging into each device. The procedure also creates an instance of an object for each device. For example, in the statement "MGTS mgts1, " "MGTS" creates an instance of an MGTS object having an identifier of "mgts1." The remaining statements in the "proc startup{ }" procedure control the login and password for the Eagle device. Thus, all the user is required to do in writing a test script is specify the command "proc startup{ }" and the devices that the user desires to start. The code in the "proc_startup{ }" procedure accesses the device packages for the individual devices and performs the functions, such as initializing memory, bringing links into service, aligning links, etc., for each specific device.

The "proc cleanup{ }" procedure includes cleanup routines for each device that are automatically called at the end of the script. Like the "startup{ }" procedure, the cleanup procedure is a procedure in the titen package that accesses the individual device packages. The "cleanup{ }" procedure performs device-specific cleanup functions, such as freeing memory, disabling links, etc. Again, all the test case designer is required to remember is the "cleanup{ }" command and the names of the devices that the designer desires to shut down. Thus, the titen package reduces the time and effort required for test case design.

The "step tp" statement defines a test in a test case. The steps are counted automatically by the Titen package and a result for each step will be generated if using TET/API-compliant test cases.

The "purpose" statement is a free form text field describing a test case. This statement can be a block of text that describes the execution of a test.

The "set" statements set environment variables read into the test.

The "mgts1 runSM" statement runs the name or number of the desired state machine on the specified node. In this example, the state machine is "AQTest7-2-4."

The "Mgts::expectEvent" procedure looks for the state machine to advance to a particular state in the PASM map. The UserAction state looks for this state in PASM and indicates that a used action on the device under test is needed.

The "Inhibit_Link" command is an abstract command language command which may be converted into a device specific command, such as eagle cli "INH-SLK:LOC=$L1_1_card:PORT=$L1_1_port". In this example, the abstract command language command is converted into an Eagle-specific command including specific variables to inhibit a signaling link of an Eagle STP.

The "Mgts::expectEvent" procedure looks for the PASM state transition after the Eagle command was sent. In particular, the procedure looks for FAILED, PASSED, or a transition from a userAction state to Stop for a timeout or abort.

The "run_testcase" statement is a wrapper that calls execution of the test case.

Test plan and test case editor 314 communicates and manages interaction with the version-controlled test plan and test case library 352. As such, individual test cases and test plans are checked in and out of version control environment 350 via editor 314. Editor 314 is also adapted to interface with the graphical user interface 310, thereby providing users with an easy to use and intuitive file creation/modification environment.

As stated above, test tools server 210 includes a scheduler that allows the user(s) to schedule immediate or delayed execution of individual test cases or test plans. Such test case and test plan scheduling capability enables test operators to efficiently allocate high-demand resources in a test lab environment by scheduling the execution of a test plan or test case during off-hours or periods of low resource usage. In one embodiment, the scheduler allocates resources by examining test environment requirements. In the ideal situation, the test environment only specifies the type of resource the test requires, and it is the responsibility of the scheduler to allocate the necessary resource(s) prior to test case execution. This approach works best for environments with a large number of uniform resources. Such a typical case would be an E-commerce server where the resource is the login ID of a particular customer or large-scale telecommunications equipment where the test is restricted to a particular shelf or even a card within a shelf and no special wiring is required (i.e., in an environment where the ratio of resources required by a test case to total number of generic resources is very low). On the other hand, if the number of resources used by a test case is close to the total amount of available resources, it may be more efficient to schedule on per-resource basis. Such is often the case in a typical telecommunications lab where equipment cannot be used to run more than one test case at any time, and there are only a few units available. In such a case, the resource schedule is defined as a relation between instances of resources, tester, test suite and time interval. Resource schedules are stored in a resource schedule repository accessible by the scheduler.

In one embodiment, test plan and test case manager 316 examines information contained in a test case or test plan related to the operating software version required on a particular test device. Once such operating software version information is determined, manager 316 communicates with a device under test operating software library 358 contained in the version control environment 350. DUT operating software library 358 maintains software associated with particular test devices (e.g., generic program loads, operating systems, feature enhancements, etc.), which enables a test system of the present invention to automatically and dynamically configure a DUT using any number of pre-defined software loads. As such, a particular version or revision of operating software associated with a DUT can be automatically downloaded and initialized on a specific DUT that is involved with the test plan/test case being executed.

Reporting manager 318 is extracts some or all of the files associated with a test plan or test case from version control environment 350. These files may include test plan or test case files, associated CIP files, test result files, and DUT operating software files. As such, reporting manager process 318 facilitates the presentation of a comprehensive, integrated view of information related to a particular test plan or test case including: test plan or test case instructions, relevant DUT specific command packages, results associated with the executed test plan/test case instructions, and operating software source code associated with relevant DUT(s). This information is accessible and displayed to a test operator via GUI interface 310.

Test Plan/Case Execution Engine

Figure 6:
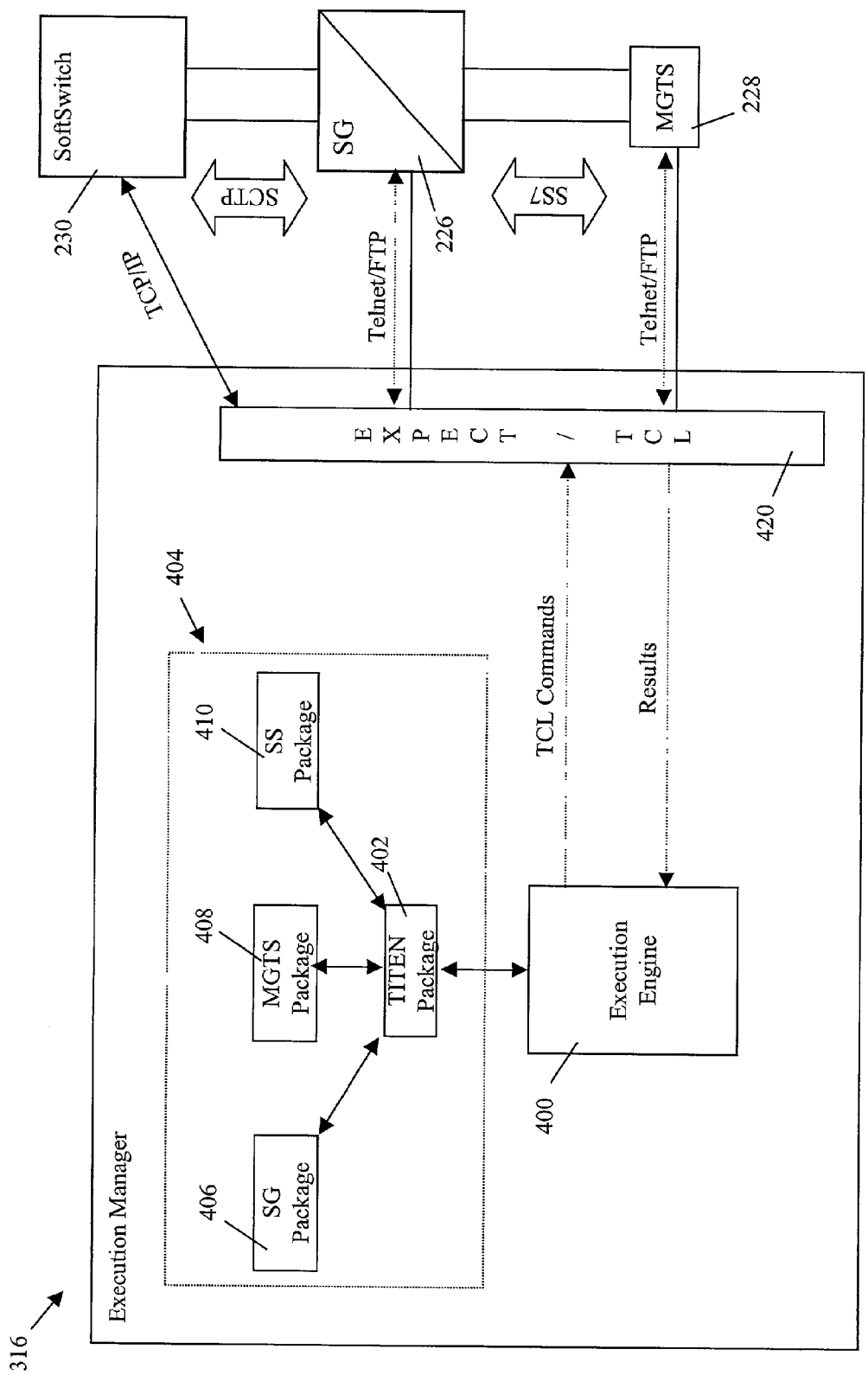
FIG. 6 is a block diagram illustrating an execution manager according to an embodiment of the present invention.

FIG. 6 illustrates one embodiment of test plan and test case execution manager 316, including information flow pathways associated with a sample system under test. The functional blocks illustrated in FIG. 6 are intended to illustrate services provided by execution manager 316. Practical implementation of this functionality could be accomplished using a variety of software constructs and architectures, and as such, the block diagram shown in FIG. 6 should be considered as only one of many possible implementation schemes.

In addition to execution manager 316, FIG. 6 includes a system under test that includes a signaling gateway node 226, a message generator and traffic simulation device 228, and a softswitch 230. The functions provided by each of these devices is not particularly relevant to the operation of the present invention, and as such detailed descriptions of these devices are not provided herein. For the purposes of illustration, each of the devices under test are assumed to include a command line interface with which the execution manager 316 communicates. However, it will be appreciated that in an alternate embodiment of the present invention, execution manager 316 may communicate with a device under test that utilizes a GUI-type interface as opposed to a command line interface. In such cases, a GUI-interfaced device under test may be configured to serve as a remote host and accept command inputs from the execution manager 316 via a connection that is similar in function to that provided by commercially available remote access products such as PCANYWHERE™ available from Symantek Corporation or CARBONCOPY™ available from Compaq Corporation. In an alternate embodiment of the invention, remote access can be achieved using any TET-enabled remote client, such as TestExpert, available from Lumenar, Inc., that supports client/server on the execution host or on a thin client web browser. The commands and command structures necessary to communicate with such GUI driven devices would be accommodated within the basic architecture of the present invention via GUI-capable communication interface packages.

Once again, for the purposes of illustration, the detailed discussions presented herein are limited to communication with those devices that employ command line interfaces, since this type of interface is currently the most widely deployed interface type. Communication with GUI-based devices can occur via a graphical user interface if a suitable GUI tester is added via a new package. Returning to FIG. 6, execution manager 316 includes an execution engine 400, a titen package 402, a plurality of device-specific test case packages 404. Execution engine 400 reads, interprets, and executes commands in a test plan or test case file. Titen package 402 includes generic classes for executing test cases, recording results, and performing common functions by accessing individual device packages, as discussed above. Packages 406, 408, and 410 include device-specific classes. According to an important aspect of the invention, these device-specific classes include functions that translate generic commands to device-specific commands. In one embodiment, the device-specific commands may be tool command language commands. In an alternate embodiment, the device-specific commands may be implemented using an alternate language, such as PERL, JAVA, or C++. The abstract-command-language-to-tool-command-language command mapping information is obtained for any given DUT from a DUT specific communication interface package. As described above, FIG. 5 illustrates exemplary tool command language to DUT-specific commands.

In the embodiment shown in FIG. 6, a DUT package is included for each DUT that is involved in a test. Each device-specific package includes device-specific commands and mappings from generic to device-specific commands. In the example shown in FIG. 6, the device-specific packages include a signaling gateway package 406, a softswitch package 408, and a message generator/traffic simulator (MGTS™) package 410.

Titen package 402 is the "glue" software component that pulls all of the packages together and provides basic common environment functionality. It is the part of the present invention that interfaces to the high-level TMS to the scripting languages. For example, titen package 402 handles automatically counting the steps of a test case and assembling them into the invocable components required by the test environment toolkit (TET). The TET is a universal management and reporting framework for conformance tests. Further information regarding TET can be found at www.tetworks.opengroup.org. Titen package 402 also includes start-up and clean-up routines required by the device packages. This allows concise, clean, and easy means to handle all device package overhead. Thus, all of the setup and clean up on the main script can be done with a couple of lines of code.

In one embodiment, titen package 402 provides the functions step, invocableComponent, infoline, result, run_testcase, try, startup, and cleanup. These actions performed by these functions are as follows:

step:
 a command used to define a step in a testcase, which can then be automatically counted.
invocableComponent, subTest:
 a command used to define a new TET invocable component. Each invocable component contains a set of test case steps.
infoline:
 a command used to print output into a journal file.
result:
 a command used to report the result of a step. If no result is provided, it defaults to NoResult.
run_testcase:
 a command that is a wrapper to call for execution of the testcase
try:
 a command similar to JAVA's "try" command that evaluates the expressions given
startup, cleanup:
 initialization and cleanup for execution of packages The command set listed above are procedures defined in the titen package. Some of the procedures, such as startup and cleanup, greatly reduce test case complexity because they include code that accesses the individual device packages for performing startup and cleanup functions. For example, if a user specifies "startup eagle1, router1," the startup procedure in the titen package automatically accesses the STP and router packages, and determines how to start each device. The test case designer need not be familiar with individual device commands or startup procedures. Allowing actions to be performed on multiple devices using a single generic command is an important feature of the invention.

In the embodiment shown in FIG. 6, communication interface 420 automatically establishes a telnet session with the command line interface of each device under test. The present invention is not limited to using telnet to connect to the command line interface of the device under test. Any protocol that allows remote terminal access to a machine is intended to be within the scope of the invention. In any event, communication interface 420 is further adapted to send and receive DUT-specific command line interface commands and receive DUT-specific results. As indicated in FIG. 6, such commands are generated by execution engine 400, while DUT test results are generated by the various devices that comprise the system under test (i.e., SG 226, SS 230, and MGTS™ 228).

Test Plan and Test Case Execution

Continuing with the example test scenario presented in FIG. 6, SG 226 and MGTS™ 228 communicate via signaling system 7 (SS7) signaling links, while SG 226 and SS node 230 communicate via stream control transmission protocol/Internet protocol (SCTP/IP). It should be noted that the test system of the present invention is not concerned with nor adapted to communicate with test devices via such inter-nodal communication interfaces. Instead, as discussed above, the present invention communicates with and controls devices under test via their administrative interfaces (e.g., command line, GUI).

Figure 7:
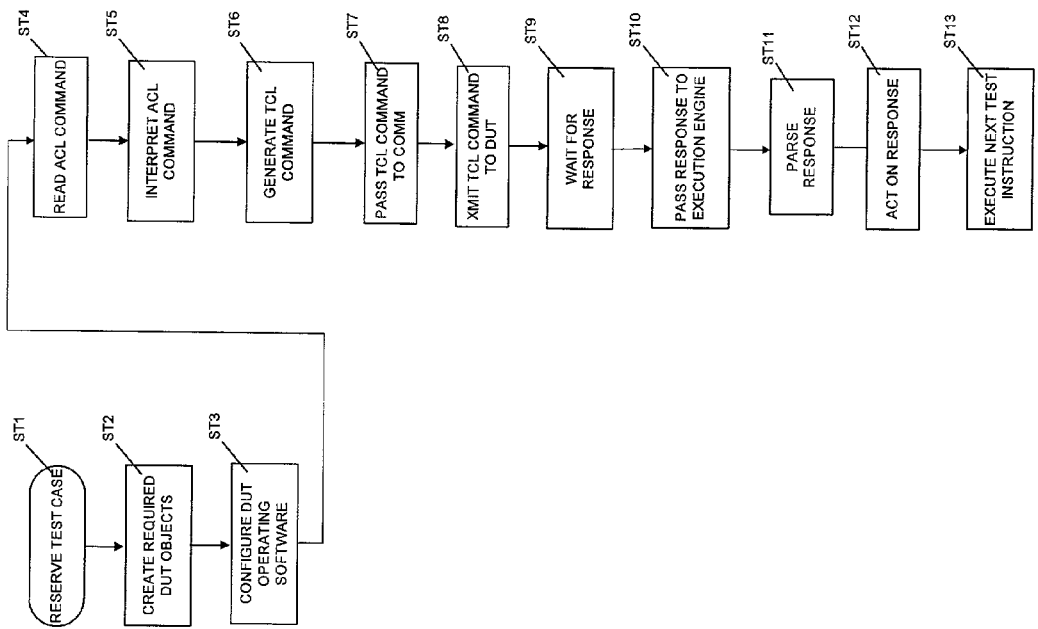
FIG. 7 is a flow chart illustrating exemplary functional processes or steps associated with test system operation according to an embodiment of the present invention.

FIG. 7 is a process flow diagram that describes exemplary steps associated with execution of a test case according to an embodiment of the invention. Corresponding information flow pathways are indicated in FIG. 6. In the description below, it is assumed that a particular test case has been selected for execution by a test operator via a TMS client 214. Test tools server schedules the test for execution and when the time for execution arrives, extracts the test from library 352 and downloads the test to execution engine 400 (ST1). Execution engine 400 opens the file and begins reading the file. Information contained within the test case file identifies one or more of the devices under test. Execution engine 400 accesses communication interface package library 356 and extracts the appropriate communication interface packages associated with each DUT, as indicated in step ST2. Information may also be included in the test case file that identifies particular DUT operating software requirements associated with the test, in which case execution engine 400 accesses DUT software library 358 and directs the appropriate software loads to each DUT (ST3).

Once initialization of all DUTs is complete and all appropriate DUT objects and instances have been created, test command instruction processing begins. The execution engine 400 reads an abstract command language command (ST4) and, based on the mapping provided by the appropriate communication interface package, interprets the command within the context of the specific DUT to which the command refers (ST5). For instance, the abstract command language command "IsLinkAligned(L1,1)," when directed to SG 226, would require input from SG package 406. The SG-specific communication interface package that was obtained from CIP library 356 contains the abstract-command-language-to-tool-command-language mapping information necessary for execution engine 400 to successfully interpret the command and produce an equivalent tool command language command (ST6). It should be noted that the mapping of abstract command language commands to tool command language commands does not necessarily yield a one-to-one correspondence. That is, a single abstract command language command associated with an SG node may map or translate to a multi-command tool command language sequence. The same property holds true for tool command language to abstract command language command mapping. That is, multiple abstract command language commands may correspond to a single tool command language command. Thus, the present invention is not limited to a one-to-one between abstract command language commands and tool command language commands.

In any event, the resulting tool command language command is subsequently passed to the communication interface 420 (ST7), as indicated in FIG. 6. In one embodiment, communication interface 420 contains components that include commonly available software tools, such as the Expect tool, available from http://expect.nist.gov. Software tools, such as Expect, provide the communication interface 420 with the ability to establish telnet sessions with various devices under test, and also provide a means for capturing streams of response data (e.g., ASCII character data) from a DUT. In the case of response data, once captured this data is provided to execution engine 400 for subsequent processing.

Figure 8:
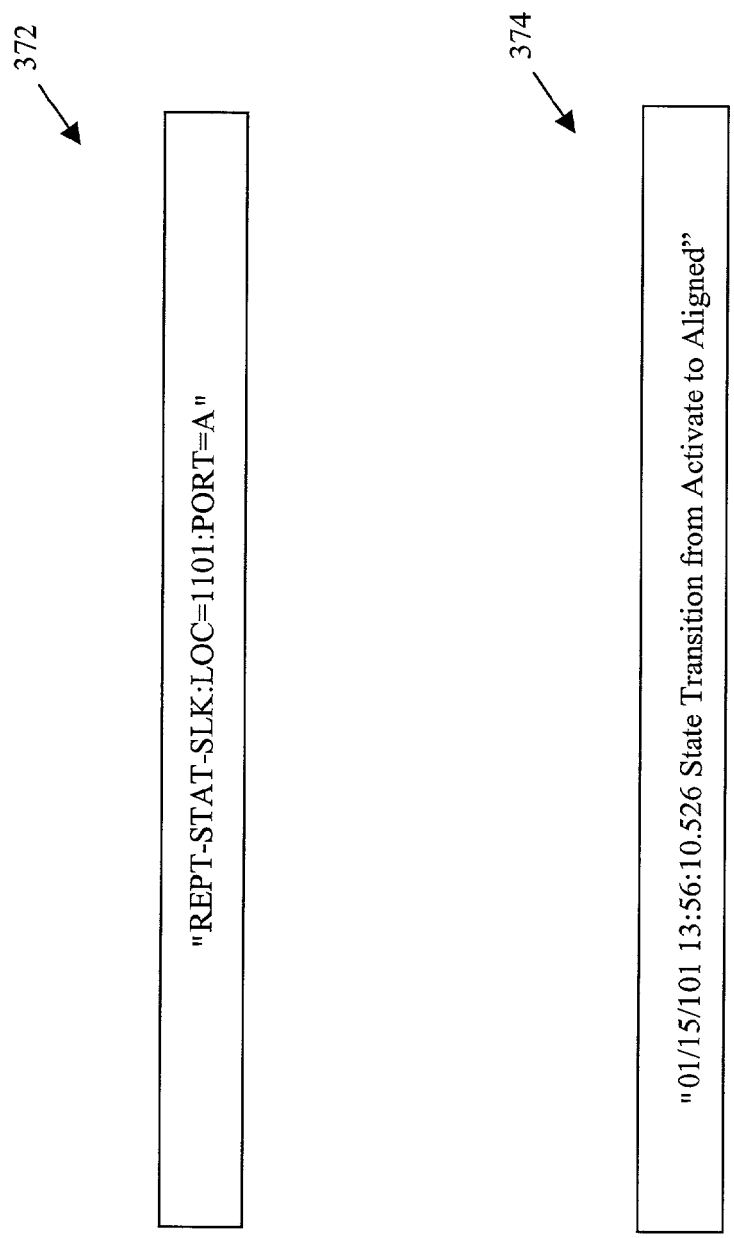
FIG. 8 is a block diagram illustrating exemplary test management system input and output messages according to an embodiment of the present invention.

As such, the outbound command is transmitted via a telnet session to the appropriate DUT (ST8). An example of one such outbound signaling gateway command 372 is shown in FIG. 8. Command 372 illustrated in FIG. 8 requests the status of a signaling link connected to signaling gateway 226. Communication interface 420 may subsequently enter a "wait" mode, during which interface 420 monitors the telnet session and waits for a response from the DUT (ST9). Once again, a typical DUT response is comprised of a stream of ASCII characters that form a text message which was originally intended to be read by a human operator via the DUT's administrative interface. Such DUT response information might include test result information, device configuration information, device status information, an acknowledgment message associated with a received command, etc. An example of one such response message 374 is shown in FIG. 8. In FIG. 8, response message 374 indicates a state transition for a signaling link from active to aligned.

In one embodiment, communication interface 420 intercepts the response data stream and provides execution engine 400 with the DUT response message in ASCII text format. Execution engine 400 receives the DUT response message, parses, and examines the text message (ST11). The ability to receive and parse DUT response messages without human operator intervention is one of the key aspects of the present invention. Such functionality enables test case scripts to be created that are capable of employing branching or conditional code structures that effectively enable dynamic test sequences to be executed which vary depending on the response of a DUT to a previous command (ST12 and ST13). For example, a test case can be created which directs MGTS™ device 228 to attempt to establish or case code could be structured such that if a response message is received from MGTS™ 228 indicating that the link could not be successfully aligned then a second link alignment should be attempted. However, in the event that a response message is received from MGTS™ 228 indicating that the link was successfully aligned then the MGTS™ 228 is directed to begin generating and transmitting a sequence of test SS7 message signaling units (MSUs) to SG 226.

An even more powerful extension of this particular test system functionality involves the ability of a first DUT to control a second DUT, even though the first DUT has no knowledge of the second DUT's control or administrative interface protocol. Such functionality is accomplished in much the same manner as is described in the previous example, only in this case the branching or conditional construct in the test case code involves multiple DUTs.

For example, a test case can be created which directs MGTS™ device 228 to attempt to establish or align a first SS7 signaling link that would be connected to SG node 226. The test case code could be structured such that if a response message is received from MGTS™ 228 indicating that the first link could not be successfully aligned then another alignment attempt on the first link should be initiated. However, in the event that a response message is received from MGTS™ 228 indicating that the first link was successfully aligned, then SG 226 is subsequently directed to drop or terminate a second signaling link. As such, MGTS™ 228 effectively directs SG 228 to initiate a link termination action.

The following code example illustrates a portion of a test case in which execution engine 400 simultaneously tests multiple devices. In this example, the first device under test is an STP, referred to as "eagle." The second device under test is an IP router, referred to in the code as "router1." Finally, a message generator/traffic simulator device "mgts1" is used to perform various tests on the devices under test. The line numbers appearing on the right hand side of each line of code are included for illustrative purposes and will be used to explain the functions of various lines of code. In the lines of code, the statements that begin with # signs are comments.

IP router port to the SSP was disabled. Thus, in the code example, the execution manager performs a conditional action based on data received from a device under test. This is a feature of the invention that has not previously been possible in conventional test systems. In conventional test systems, a human operator would be required to enter the command for deactivating a link via the command line interface of one device, monitor the results on a separate terminal, decide what action to take based on the results, and manually reconfigure the second device. Accordingly, it can be seen that the present invention can save time and effort when testing multiple different devices.

It will be appreciated that significantly more complex multi-DUT interactions can be easily accommodated by a test system of the present invention. For instance, SS7 level 2 and level 3 conformance testing is currently a complex and time consuming activity that often takes days or weeks to complete by a human operator. A test system of the present invention can be easily configured to automatically administer complete SS7 level 2 and level 3 conformance tests within a matter of hours, without the need for human operator intervention.

It will be understood that various details of the invention may be changed without departing from the scope of the invention. Furthermore, the foregoing description is for the purpose of illustration only, and not for the purpose of limitation—the invention being defined by the claims.

What is claimed is:

```
1    # deactivate SS7 link and verify alarm
2    # else deactivate IP router port and verify alarm in 3 sec
3
4    mgts1 cli Deactivate link: Port= $SSP1_port
5
6    # check for alarms
7    set time 0
8    while {$time < 3} {
9        eagle cli "REPT-STAT-ALM" result
10           if {[regexp "ALARM.*MAJR" [lindex $result (response) 1]]} {
11               set eagle_alarm 1
12               infoline "Eagle alarm verified"
13               break
14
15       } else {
16           # deactivate an IP Router port"
17           router1 cli Deactivate port: Port= $SSP2_port
18           infoline "Router IP port disabled"
19       }
20       sleep 1
21       set time [expr $time +1]
22   }
```

In line 4 of the code, execution engine 400 deactivates SSP port 1 on the MGTS. In a real network, deactivation of a port from an SSP should trigger an alarm at the corresponding STP. Accordingly, in line 8 of the code, the test case includes a while loop that checks for an alarm at the eagle STP. In line 9 of the code, the test case checks for the alarm status of the eagle. In line 10, the code checks for whether there is a major alarm on the eagle. In line 11, the code sets the eagle alarm flag if a major alarm occurs. Line 12 of the code logs the alarm in a log file. I In line 17, the code deactivates SSP port 2 on an IP router. In line 18, the code logs the fact that the IP router port was disabled. The code then returns to the beginning of the while loop and checks whether the Eagle detects the fact that the 1. A method for testing a system of communications network devices, the method comprising:

(a) reading a first abstract command language command from a test case, the first abstract command language command comprising a non-device-specific command;

(b) translating the first abstract command language command into a device-specific command compatible with an administrative interface associated with a first device under test (DUT);

(c) communicating the device-specific command to the first DUT;

(d) receiving a reply from the first DUT; and (e) responsive to the reply from the first DUT, automatically generating a second device-specific command associated with a second DUT.

2. The method of claim 1 wherein receiving a reply message includes receiving a message containing test result information.

3. The method of claim 1 wherein receiving a reply message includes receiving a message containing an acknowledgment message.

4. The method of claim 1 wherein receiving a reply message includes receiving a message containing status information associated with the first device under test.

5. The method of claim 1 comprising generating a second abstract command language command in response to the reply message and translating the second abstract command language command into the second device-specific command.

6. The method of claim 1 wherein generating a second device-specific command includes generating a command line interface command compatible with a command line interface of the second DUT.

7. The method of claim 6 wherein the second DUT is a packet network testing device.

8. The method of claim 1 wherein translating the abstract command language command includes accessing a device-specific communication interface package that contains abstract command language translation instructions.

9. The method of claim 1 wherein the first DUT is a packet routing switch.

10. The method of claim 1, wherein the second device-specific command associated with the second DUT is based on information from the reply from the first DUT.

11. The method of claim 1, wherein the second device-specific command associated with the second DUT triggers a reconfiguration of the second DUT based on the reply from the first DUT.

12. The method of claim 1, comprising dynamically scheduling the communication of the device-specific command to the first DUT to avoid conflicts with other device-specific commands sent to the first DUT.

13. A method for testing a system of communications network devices, the method comprising:
(a) reading a first abstract command language command from a test case, the first abstract command language command comprising a non-device-specific command;
(b) translating the first abstract command language command into a device-specific command compatible with an administrative interface associated with a first device under test (DUT); and
(c) communicating the device-specific command to the first DUT;
wherein translating the abstract command language command into a device-specific command includes translating the abstract command language command into a command line interface (CLI) command compatible with a command-line interface associated with the first DUT.

14. A method for testing a system of communications network devices, the method comprising:
(a) reading a first abstract command language command from a test case, the first abstract command language command comprising a non-device-specific command;
(b) translating the first abstract command language command into a device-specific command compatible with an administrative interface associated with a first device under test (DUT); and
(c) communicating the device-specific command to the first DUT;
wherein communicating the device-specific command to the first DUT includes transmitting the device-specific command via a telnet session.

15. A method for dynamically testing a system of communications network devices, the method comprising:
(a) reading a first abstract command language command associated with an operation involving a first device under test (DUT);
(b) translating the first abstract command language command into a first command line interface command;
(c) transmitting the first command line interface command to the first DUT;
(d) receiving a reply message from the first DUT;
(e) dynamically selecting a second abstract command language command based on contents of the reply message; and
(f) executing the second abstract command language command.

16. The method of claim 15 wherein translating the first abstract command language command into a first command line interface command includes accessing a communication interface package associated with the first DUT.

17. The method of claim 15 wherein transmitting the first command line interface command to the first DUT includes transmitting the command line interface command using remote terminal access software.

18. The method of claim 15 wherein transmitting the first command line interface command to the first DUT includes transmitting the command line interface command over a wide area network (WAN).

19. The method of claim 15 wherein receiving a reply message includes receiving test result information.

20. The method of claim 15 wherein receiving a reply message includes receiving an acknowledgment message associated with a previously-executed command.

21. A system for testing communications network devices, the system comprising:
(a) a device specific communication interface package including information for mapping an abstract command language command to a device specific command;
(b) an execution manager for translating abstract command language commands to device-specific commands using the device-specific communication interface package, wherein the device-specific commands are command line interface commands; and
(c) a user interface for initiating the execution of an abstract-command-language-based test procedure and displaying subsequent test results.

22. The system of claim 21 wherein the execution manager is adapted to receive and interpret a response message generated by a DUT.

23. The system of claim 21 wherein the execution manager is adapted to direct a DUT to be configured with a specific operating software version.

24. The system of claim 21 wherein the execution manager is adapted to schedule the execution of a test case or a test plan.

25. The system of claim 21 wherein the user interface is a graphical user interface (GUI).

26. The system of claim 21 including a version-controlled environment for maintaining information associated with a test and a device under test (DUT).

27. The system of claim 26 wherein the version-controlled environment is adapted to maintain DUT-specific communication interface packages.

28. The system of claim 26 wherein the version-controlled environment is adapted to maintain test plan and test case files.

29. The system of claim 26 wherein the version-controlled environment is adapted to maintain test result information.

30. The system of claim 26 wherein the version-controlled environment is adapted to maintain DUT operating software.

31. The system of claim 21 including a test case editor for editing test case information, wherein the test case editor is accessible via the user interface.

32. A system for testing communications network devices, the system comprising:
 (a) a device specific communication interface package including information for mapping an abstract command language command to a device specific command;
 (b) an execution manager for translating abstract command language commands to device-specific commands using the device-specific communication interface package; and
 (c) a user interface for initiating the execution of an abstract-command-language-based test procedure and displaying subsequent test results;
 wherein the user interface is adapted to simultaneously display related test plan, test case, and test result information.

33. A system for simultaneously testing a plurality of communications network devices, the system comprising:
 (a) a test tools server for storing a plurality of device-specific communication interface packages, each device-specific communication interface package including functions for mapping abstract command language commands to device-specific command line interface commands;
 (b) a test management system client for requesting execution of test cases on the devices under test; and
 (c) a test controller for receiving the test cases and the communication interface packages, connecting with a plurality of communications network devices, and executing the test cases to test the network communications devices, wherein the test controller is adapted to simultaneously communicate with command line interfaces of the communications network devices in order to execute test cases and record results.

34. The system of claim 33 wherein the test tools server stores a generic communication interface package containing common procedures for accessing the device-specific packages and performing device-specific functions during a test case.

35. The system of claim 33 wherein the test tools server includes an arbitration engine for dynamically resolving test case scheduling conflicts.

36. The system of claim 33 wherein the device-specific communication interface commands include functions for mapping abstract command language commands to tool command language commands.

37. A system for simultaneously testing a plurality of communications network devices, the system comprising:
 (a) a test tools server for storing a plurality of device-specific communication interface packages, each device-specific communication interface package including functions for mapping abstract command language commands to device-specific command line interface commands;
 (b) a test management system client for requesting execution of test cases on the devices under test; and
 (c) a test controller for receiving the test cases and the communication interface packages, connecting with a plurality of communications network devices, and executing the test cases to test the network communications devices;
 wherein the test tools server stores a generic communication interface package containing common procedures for accessing the device-specific packages and performing device-specific functions during a test case, and the generic communication interface package includes a startup procedure for accessing the device-specific packages to initialize each device involved in a test case.

38. A system for simultaneously testing a plurality of communications network devices, the system comprising:
 (a) a test tools server for storing a plurality of device-specific communication interface packages, each device-specific communication interface package including functions for mapping abstract command language commands to device-specific command line interface commands;
 (b) a test management system client for requesting execution of test cases on the devices under test; and
 (c) a test controller for receiving the test cases and the communication interface packages, connecting with a plurality of communications network devices, and executing the test cases to test the network communications devices;
 wherein the test tools server stores a generic communication interface package containing common procedures for accessing the device-specific packages and performing device-specific functions during a test case, and the generic communication interface packages includes a cleanup procedure for accessing the device-specific packages to free resources on each device involved in a test case.

39. A test script comprising computer executable instructions embodied in a computer-readable medium, the test script comprising:
 (a) first computer code for incorporating packages containing abstract to device-specific command mappings for a plurality of network elements to be tested; and
 (b) second computer code including functions provided by the packages to test a plurality of network communication devices, wherein information obtained via communicating with a first tested network communication device is used to test at least one other network communication device.

* * * * *